US011250840B1

(12) United States Patent
Teig

(10) Patent No.: US 11,250,840 B1
(45) Date of Patent: Feb. 15, 2022

(54) MACHINE-TRAINED NETWORK DETECTING CONTEXT-SENSITIVE WAKE EXPRESSIONS FOR A DIGITAL ASSISTANT

(71) Applicant: Perceive Corporation, San Jose, CA (US)

(72) Inventor: Steven L. Teig, Menlo Park, CA (US)

(73) Assignee: PERCEIVE CORPORATION, San Jose, CA (US)

( * ) Notice: Subject to any disclaimer, the term of this patent is extended or adjusted under 35 U.S.C. 154(b) by 207 days.

(21) Appl. No.: 16/376,637

(22) Filed: Apr. 5, 2019

Related U.S. Application Data

(60) Provisional application No. 62/654,529, filed on Apr. 9, 2018.

(51) Int. Cl.
  *G10L 15/16* (2006.01)
  *G10L 15/08* (2006.01)
  *G06N 3/08* (2006.01)
  *G06N 3/04* (2006.01)

(52) U.S. Cl.
  CPC ............. *G10L 15/16* (2013.01); *G06N 3/049* (2013.01); *G06N 3/084* (2013.01); *G10L 2015/088* (2013.01)

(58) Field of Classification Search
  CPC ... G10L 15/16; G10L 2015/088; G06N 3/049; G06N 3/084
  USPC .......................................................... 704/232
  See application file for complete search history.

(56) References Cited

U.S. PATENT DOCUMENTS

| 5,579,436 | A | * | 11/1996 | Chou | .................... | G10L 15/063 |
| | | | | | | 704/236 |
| 9,697,828 | B1 | * | 7/2017 | Prasad | .................... | G10L 15/18 |
| 10,069,976 | B1 | * | 9/2018 | Gunther | .................. | H04M 3/42 |
| 10,643,606 | B2 | * | 5/2020 | Piersol | .................... | G10L 15/08 |
| 10,847,137 | B1 | * | 11/2020 | Mandal | .................. | G10L 15/16 |
| 2008/0319745 | A1 | * | 12/2008 | Caldwell | ............ | H04N 21/4788 |
| | | | | | | 704/235 |

(Continued)

OTHER PUBLICATIONS

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

(Continued)

*Primary Examiner* — Fariba Sirjani
(74) *Attorney, Agent, or Firm* — Adeli LLP

(57) ABSTRACT

Some embodiments provide a method of training a MT network to detect a wake expression that directs a digital assistant to perform an operation based on a request that follows the expression. The MT network includes processing nodes with configurable parameters. The method iteratively selects different sets of input values with known sets of output values. Each of a first group of input value sets includes a vocative use of the expression. Each of a second group of input value sets includes a non-vocative use of the expression. For each set of input values, the method uses the MT network to process the input set to produce an output value set and computes an error value that expresses an error between the produced output value set and the known output value set. Based on the error values, the method adjusts configurable parameters of the processing nodes of the MT network.

18 Claims, 6 Drawing Sheets

(56) References Cited

U.S. PATENT DOCUMENTS

| | | | |
|---|---|---|---|
| 2014/0200877 A1* | 7/2014 | McCann | G09B 19/04 |
| | | | 704/2 |
| 2015/0161995 A1 | 6/2015 | Sainath et al. | |
| 2015/0340032 A1* | 11/2015 | Gruenstein | G06F 16/367 |
| | | | 704/232 |
| 2016/0071399 A1* | 3/2016 | Altman | G08B 25/005 |
| | | | 340/539.11 |
| 2016/0125874 A1* | 5/2016 | Yong | G10L 15/14 |
| | | | 704/251 |
| 2016/0240193 A1* | 8/2016 | Gulati | G10L 15/22 |
| 2016/0293168 A1* | 10/2016 | Chen | G10L 15/22 |
| 2018/0061408 A1* | 3/2018 | Andreas | G10L 15/063 |
| 2018/0133900 A1* | 5/2018 | Breazeal | B25J 19/026 |
| 2019/0147904 A1* | 5/2019 | Tao | G10L 15/08 |
| | | | 704/231 |
| 2019/0155566 A1* | 5/2019 | Dory | G06F 3/167 |
| 2019/0180737 A1* | 6/2019 | Abuelsaad | G10L 15/19 |
| 2020/0051550 A1* | 2/2020 | Baker | G10L 15/02 |
| 2020/0326909 A1* | 10/2020 | Wilberding | H04N 21/42203 |

OTHER PUBLICATIONS

Jain, Anil K., et al., "Artificial Neural Networks: A Tutorial," Computer, Mar. 1996, 14 pages, vol. 29, Issue 3, IEEE.

Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

Marcheret, Etienne, et al., "Detecting Audio-Visual Synchrony Using Deep Neural Networks," INTERSPEECH 2015, Sep. 6-10, 2015, 5 pages, ISCA, Dresden, Germany.

* cited by examiner

MACHINE-TRAINED NETWORK DETECTING CONTEXT-SENSITIVE WAKE EXPRESSIONS FOR A DIGITAL ASSISTANT

BACKGROUND

Today, digital assistants (e.g., Amazon Echo, Apple Siri, and Google Now) commonly employ wake words to be told to listen to instructions that follow. Examples of such wake words include "Alexa" or "Hey Siri." Digital assistants typically employ wake words in order to avoid sending all captured audio to the Cloud. To implement wake words, the digital assistants typically execute simple speech recognition processes that recognize the wake word.

Unfortunately, a digital assistant typically does not distinguish between someone casually referencing a wake word in regular conversation and directly invoking a wake word to command the digital assistant to perform an operation. For example, Amazon Echo does not differentiate between someone talking about Alexa and someone talking to Alexa. Hence, every time a sequence of syllables that resembles "Alexa" is said aloud, the Amazon Echo wakes ups. Owners of the Echo have learned to refer to it by other, non-Alexa names to circumvent this annoyance, but a more proper solution is needed.

SUMMARY

Some embodiments of the invention provide a digital assistant with a machine-trained network with machine-trained processing nodes that processes sound to detect wake expression in a context-sensitive way. In some embodiments, the machine-trained (MT) network is a neural network, such as a RNN (recurrent neural network), an LSTM (long short-term memory) network, etc. In some embodiments, the machine-trained network is trained with one or more training sets that allow the network to distinguish vocative uses of the wake expression versus non-vocative uses of the wake expression. In some embodiments, the wake expression includes a name associated with the digital assistant. In some of these embodiments, the training set trains the MT network to differentiate between the vocative case of the name and the other cases of the name (e.g., the dative, ablative, genitive, etc. uses of the name).

The training set is defined in some embodiments to use both grammar and prosody to differentiate vocative uses of the wake expression from the non-vocative uses of the wake expressions. The training set in some embodiments includes numerous input/output pairs, with (1) the input in each pair including a phrase, word or sound that may or may not include the wake expression and (2) the output in each pair specifying whether the corresponding input includes the wake expression.

In some embodiments, the input/output pairs of the training set are selected to differentiate the syntactical (grammatical) components and tonal (prosodic) components in different vocative uses of the wake expression from the syntactical and tonal components of the different non-vocative uses of the wake expressions. Such a training set configures the machine-trained network to detect vocative uses of the wake expressions, while ignoring the non-vocative uses of the wake expressions. The training set also includes input phrases, words, or sounds that do not include the wake expression and outputs that specify that the corresponding inputs did not include the wake expression.

BRIEF DESCRIPTION OF FIGURES

The novel features of the invention are set forth in the appended claims. However, for purposes of explanation, several embodiments of the invention are set forth in the following figures.

DETAILED DESCRIPTION

Figure 1:
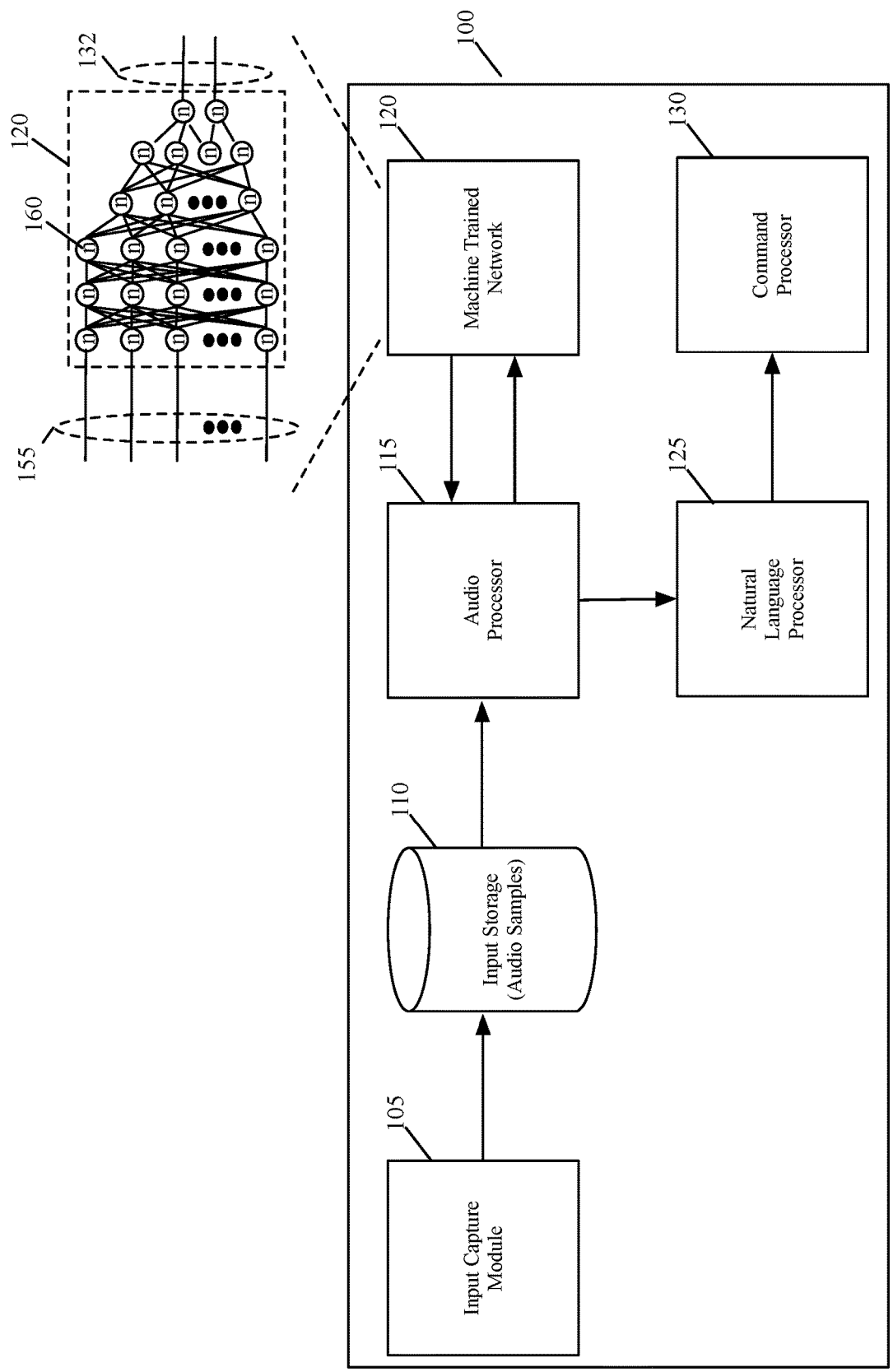
FIG. 1 illustrates a digital assistant that has a machine-trained network that processes sound to detect wake expression in a context-sensitive way.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a digital assistant with a machine-trained network with machine-trained processing nodes that processes sound to detect wake expression in a context-sensitive way. In some embodiments, the machine-trained (MT) network is a neural network, such as a RNN (recurrent neural network), an LSTM (long short-term memory) network, etc. In some embodiments, the machine-trained network is trained with one or more training sets that allow the network to distinguish vocative uses of the wake expression versus non-vocative uses of the wake expression. In some embodiments, the wake expression includes a name associated with the digital assistant. In some of these embodiments, the training set trains the MT network to differentiate between the vocative case of the name and the other cases of the name (e.g., the dative, ablative, genitive, etc. uses of the name).

In some embodiments, the vocative use of a wake expression includes the digital assistant's name in a particular sentence structure and tonal inflection that makes it clear that the name is being used to address or invoke the digital assistant (e.g., saying Alexa with a pause before it and the tone going up after the first syllable). In these embodiments, this is in contrast to (1) the dative use of the wake expression that includes the digital assistant's name as an indirect object or recipient (e.g., "tired of Alexa"), (2) the ablative use of the wake expression that includes the digital assistant's name to indicate a separation or an agent, instrument, or location (e.g., "I'm done with Alexa"), (3) the genitive use of the wake expression that includes the digital assistant's name to possession (e.g., "Alexa's problems"), and (4) the accusative use of the wake expression that includes the digital assistant's name as a direct object (e.g., "my daughter loves Alexa").

Accordingly, in some embodiments, the training set is defined to use both grammar and prosody to differentiate vocative uses of the wake expression from the non-vocative uses of the wake expressions. The training set in some embodiments includes numerous input/output pairs, with (1) the input in each pair including a phrase, word or sound that may or may not include the wake expression and (2) the output in each pair specifying whether the corresponding input includes the wake expression.

In some embodiments, the input/output pairs of the training set are selected to differentiate the syntactical (grammatical) components and tonal (prosodic) components in different vocative uses of the wake expression from the syntactical and tonal components of the different non-vocative uses of the wake expressions. Such a training set configures the machine-trained network to detect vocative uses of the wake expressions, while ignoring the non-vocative uses of the wake expressions. The training set also includes input phrases, words, or sounds that do not include the wake expression and outputs that specify that the corresponding inputs did not include the wake expression.

FIG. 1 illustrates a digital assistant 100 that has a machine-trained network that processes sound to detect wake expression in a context-sensitive way. The digital assistant 100 continuously captures audio input and ignores this input when the input does not include a vocative use of a wake expression of the digital assistant. However, when the captured audio input includes a vocative use of the wake expression of the digital assistant, the digital assistant can perform numerous actions based on input (e.g., audio input) that is received after a user says the wake expression. Examples of such actions would be to provide a weather forecast for a particular day or week, to play music, to provide sport scores, to read or update news, to add items to shopping lists, to create a list of reminders, to store contact information or an address, etc.

As shown, the digital assistant 100 includes an input capture module 105, a storage 110, an audio processor 115, a machine-trained network 120, a natural language processor 125, and a command processor 130. The audio capture module 105 converts audio input captured by a microphone (not shown) of the digital assistant into digital audio samples that it then stores in the input storage 110. In some embodiments, the audio capture module continuously performs this operation to store a stream of audio input that is picked up by the microphone. The audio capture module in some embodiments has a thresholding module that allows it to detect long periods that do not include any other noise than ambient noise. During such periods, the audio capture module 105 does not store any audio input samples in the input storage 110.

The audio processor 115 repeatedly retrieves audio sample sequences from the input storage 110 and provides each retrieved sequence to the machine-trained network 120. In some embodiments, the audio sample sequences are overlapping sequences in case the wake expression is partially cut off in an earlier sequence. The audio processor uses the machine-trained network 120 as a pre-processor of the audio samples in order to detect whether the captured audio input includes a vocative use of a wake expression associated with the digital assistant 100. In some embodiments, the digital assistant only has one wake expression associated with it. In other embodiments, the digital assistant has several wake expressions associated with it. Also, in some embodiments, the wake expression includes a name that the user of the digital assistant associates with the digital assistant. This name is provided in some cases by the manufactures, while in other cases it is a name that is selected and configured by the user.

The MT network 120 processes each audio sample sequence 155 that it receives from the audio processor to determine whether the sequence includes a vocative use of a wake expression of the digital assistant. The MT network in some embodiments includes several layers of processing nodes 160 that are trained through machine learning to differentiate vocative uses of the wake expression from non-vocative uses of the wake expression and from audio input that does not include any case of the wake expression. The MT network provides an output 132 that specifies whether an audio sample sequence that it analyzed included a vocative use of the wake expression.

In some embodiments, the MT network 120 is trained with multiple trainings sets, each of which includes different sets of input values with known sets of output values. In the different training sets in some embodiments, each of a first group of audio input values includes a vocative use of the wake expression and has a corresponding output value that specifies that the input value includes a vocative use of the wake expression, while each of a second group of audio input values comprises a non-vocative use of the wake expression and has a corresponding output value that specifies that the input value set does not include a vocative use of the wake expression. Also, each training set in some embodiments also a third group of audio inputs/outputs, with each audio input in this group not including any case of the wake expression and the output indicating that the corresponding input does not include a vocative use of the wake expression.

For each input value, the MT network processes the input value to produce an output value set, from which an error value is then computed to express an error between the produced output value set and the known output value of the input value. Based on the error values computed for the different sets of input/output values, the configurable parameters of the processing nodes of the MT network are then adjusted. After multiple processing multiple batches and/or multiple training sets and adjusting the configurable parameters of the processing nodes based on this processing, the MT network is trained to detect vocative uses of the wake expression from non-vocative uses of the wake expression and from audio input that does not include any case of the wake expression.

In some embodiments, non-vocative uses of the wake expression include ablative uses, dative uses, accusative uses and genitive uses of the wake expression. The MT network 120 uses both grammar and prosody to discriminate vocative uses of the wake expression from the non-vocative uses (from the dative, genitive, ablative cases of the wake expression). In other words, the MT network is trained to use both the syntactical component and tonal components of speech to identify vocative utterances of the wake expression.

To train the MT network in this manner, the input values in the first and second input/output groups (that include vocative and non-vocative utterances of the wake expression) use the wake expression differently in different syntactical sentence structures associated with the vocative use of the wake expression and the non-vocative use of the wake expression. Specifically, in some embodiments, the different syntactical sentence structures of the first and second groups differentiate syntactical sentence structures associated with the vocative use of the expression from syntactical sentence structures associated with at least one of an ablative use of the wake expression, a dative use of the wake expression and a genitive use of the wake expression.

To train the MT network, the input values in the first and second input/output groups also include different prosodic utterances of the wake expression, with the input value sets of the first group including prosodic utterances of the wake expression associated with the vocative use of the wake expression while the input value sets of the second group including prosodic utterances of the wake expression associated with the non-vocative use of the wake expression. The different prosodic utterances of the first and second groups differentiate prosodic utterances associated with the vocative use of the expression from prosodic utterances associated with ablative, dative and genitive uses of the wake expression.

As mentioned above, the vocative use of a wake expression in some embodiments includes the digital assistant's name in a particular sentence structure and tonal inflection that makes it clear that the name is being used to address or invoke the digital assistant. One example of such a syntactical structure would be a pause before invoking the name of the digital assistant with the tone going up after the initial one or two syllables (e.g., saying Alexa with a pause before it and the tone going up after the first syllable). Accordingly, the MT network in some embodiments is trained to look for the wake expression (e.g., the digital assistants name) that appears after such a pause with such a prosody.

In some embodiments, the MT network is also trained to ignore recitations of the wake expression (e.g., the digital assistants name) that follow prepositions (e.g., to, with, from, etc.) that are associated with the dative use of the wake expression (e.g., "tired of Alexa") or ablative use of the wake expression (e.g., "I'm done with Alexa"), or are in syntactical structures associated with other cases of the wake expression (e.g., the accusative use such as "my daughter loves Alexa"). The MT network in some embodiments is also trained with the prosodic delivery of these non-vocative utterance of the wake expression. As mentioned above, the prosodic training ensures that the MT network can differentiate the change of intonation that reflects the vocative use of the wake expression (e.g., the vocative utterance of the digital assistant's name) with the tonal delivery for the non-vocative utterances of the wake expression. In this manner, the context sensitivity of the MT network derives from both the grammatical component and the prosodic component of an utterance that includes the wake expression.

When the audio processor 115 receives an output 132 from the MT network that indicates that the audio sample sequence did not include a vocative use of the wake expression, the audio processor discards the audio sample sequence. On the other hand, when the output 132 indicates that that processed audio sample sequence includes a vocative use of the wake expression, the audio processor 115 supplies the audio sample sequence and/or one or more subsequent audio sample sequences to the natural language processor 125.

The natural language processor analyzes the audio samples sequence(s) that it receives, to identify the command in the audio request that follows the vocative use of the wake expression. In some embodiments, the MT network 120 provides to the audio processor 115 a time value that identifies the location in the audio sample sequence at which the wake expression ended. In these embodiments, the audio processor uses this identified location to filter out the wake expression from the audio sample sequence(s) that it provides to the natural language processor. In other embodiments, the audio processor provides this identified location to the natural language processor, which then uses this location to identify the start of the audio content that it should analyze to identify the audio request that follows the vocative wake-expression utterance. In still other embodiments, the audio processor provides the audio sample sequence(s) with the vocative wake expression, and the natural language processor analyzes these samples independently to identify the wake expression as well as the request that follows the wake expression.

After identifying the request that follows the wake expression, the natural language processor passes the request to the command processor 130, which the performs the operation associated with this request (e.g., provides a weather forecast for a particular day or week, plays music, provides sport scores, reads news, adds items to shopping lists, creates a list of reminders, stores contact information or an address, etc.).

In some embodiments, the command processor 130 is a server module outside of the digital assistant. In these embodiments, the language processor 125 extracts the portion of the audio sample that includes what is perceived to be a user's voice (with or without the wake expression) and forwards the extracted audio samples to external command processor through a network (e.g., local area network that connects to the Internet) to a remote server that implements the command processor 130. The remote command processor in some embodiments has its own natural language processor (NLP) that analyzes the received audio samples to identify the request in these samples. This NLP then provide the remote command processor the identified request to process. After processing this request, the remote command processor returns its results to the digital assistant, or its instructions for the digital assistant to follow, through the network that connects the remote command processor and the digital assistant.

Figure 2:
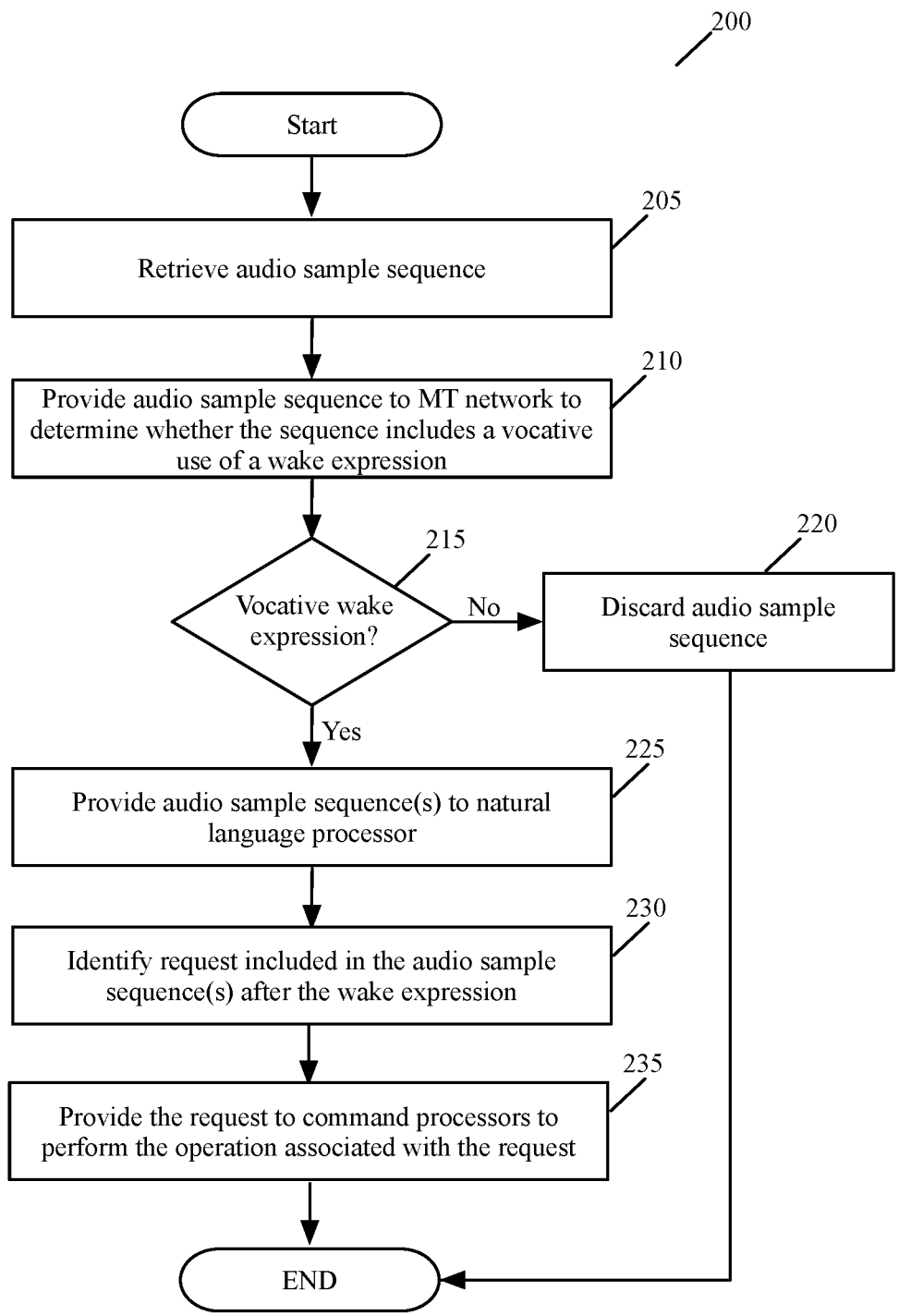
FIG. 2 presents a process that illustrates the operations of the modules of the digital assistant to process an audio sample sequence to determine whether the sequence includes a vocative use of a wake expression.

FIG. 2 presents a process 200 that illustrates the operations of the modules of the digital assistant 100 to process an audio sample sequence to determine whether the sequence includes a vocative use of a wake expression. As shown, the process 200 initially starts when the audio processor 115 retrieves (at 205) an audio sample sequence from the input storage 110, which it provides (at 210) to the MT network 120.

This MT network processes the audio sample sequence that it receives to determine whether the sequence includes a vocative use of a wake expression of the digital assistant. The MT network provides the result of its process as an output 132 to the audio processor 115. As mentioned above, the MT network 120 provides to the audio processor 115 a time value that identifies the location in the audio sample sequence at which the wake expression ended.

At 215, the audio processor determines whether the MT-network's output indicates that the processed audio sample sequence included a vocative use of a wake expression. When it does not, the audio processor discards (at 220) the audio sample sequence, and the processing for the audio sample sequence retrieved (at 205) ends. On the other hand, when the output 132 indicates that that processed audio sample sequence includes a vocative use of the wake expression, the audio processor 115 supplies (at 225) the retrieved audio sample sequence and/or one or more subsequent audio sample sequences to the natural language processor 125. In some embodiments in which the MT network 120 outputs a time value that identifies the location of the wake expression, the audio processor uses this identified location to filter out the wake expression from the audio sample sequence(s) that it provides to the natural language processor, or provides this identified location to the natural language processor.

The NLP 125 analyzes (at 230) the audio samples sequence(s) that it receives, to identify the command in the audio request that follows the vocative use of the wake expression. In the embodiments in which the NLP 125 receives the identified location of the wake expression from the audio processor, the NLP uses this location to identify the start of the audio content that it should analyze to identify the audio request that follows the vocative wake-expression utterance. In still other embodiments, the audio processor provides the audio sample sequence(s) with the vocative wake expression, and the natural language processor analyzes these samples independently to identify the wake expression as well as the request that follows the wake expression.

After identifying (at 230) the request that follows the wake expression, the natural language processor passes (at 235) the request to the command processor 130, which the performs the operation associated with this request (e.g., provides a weather forecast for a particular day or week, plays music, provides sport scores, reads news, adds items to shopping lists, creates a list of reminders, stores contact information or an address, etc.). As mentioned above, the NLP 125 and the command processor 130 are server-side modules in some embodiments.

In some of these embodiments, the audio processor 115 provides the audio sample sequence(s) in one or more data packets that it transmits through a network to the remote NLP and command processor. The remote NLP then analyzes the received audio samples to identify the request in these samples, and then provides the remote command processor the identified request to process. After processing this request, the remote command processor returns its results to the digital assistant, or its instructions for the digital assistant to follow, through one or more data packets that it transmits back to the digital assistant through the network.

The digital assistant 100 uses different MT networks in different embodiments. In some embodiments, the digital assistant uses a combined convolutional neural network (CNN) and a hidden Markov model (HMM) network. The MT network in other embodiments is a stateful network like an RNN or an LSTM network. In some of these embodiments, the MT network 120 has a front end time-to-frequency converter that transforms the raw utterances from the time domain into the frequency domain. The converted data is in the form of a spectrogram with frequency components on the Y-axis and time on the X-axis. Such a spectrogram is like a moving histogram for the different frequency components in the processed audio sequence sample.

Figure 3:
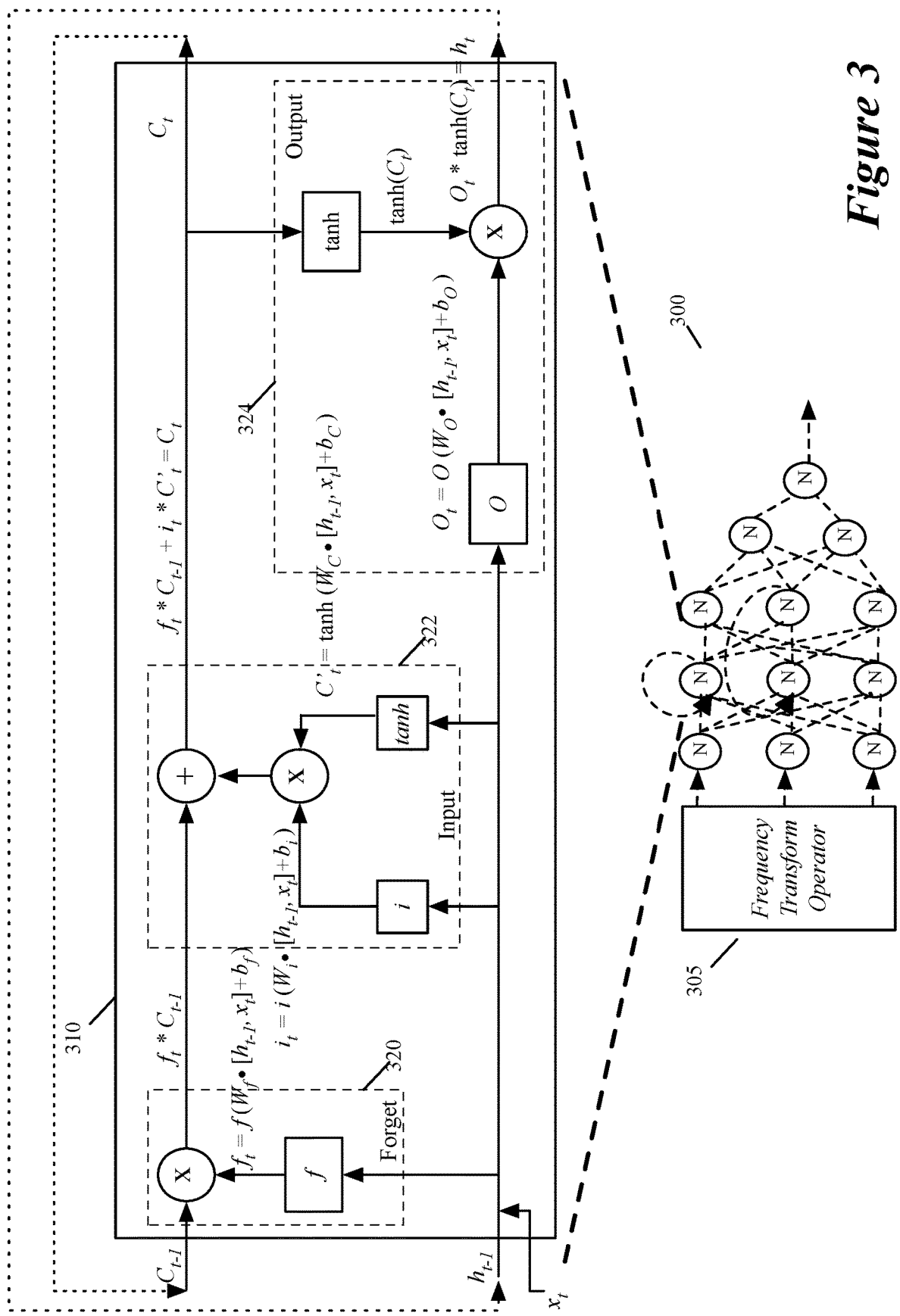
FIG. 3 illustrates an example of an LSTM network of some embodiments.

FIG. 3 illustrates an example of an LSTM network 300 with such a front-end converter 305. The LSTM network is a type of RNN with the neurons being LSTM units 310. The use of LSTM units allows for the evaluation of previous information in performing an operation on a current input. An LSTM unit remembers information used to add further context in evaluating and processing input by maintaining a cell state. The LSTM unit includes three gates for modifying the cell state and using the cell state in processing input: a forget gate 320, an input gate 322, and an output gate 324. The forget gate erases information from the cell state, the input gate modifies the cell state and adds new information, and the output gate generates an output based on the modified cell state and the received input.

Each gate performs linear and non-linear operations on the input received at the LSTM unit. The linear portion of the operations includes, at each gate, performing a dot product operation on the input to the gate using a set of weights for the gate and adding a scalar for the gate to the product. The non-linear portion of the operations includes, at each gate, applying an activation function to the product of the linear portion of the operations. The input gate performs two such operations, each with a set of weights, a scalar, and an activation function for the gate.

More specifically, the LSTM unit receive a cell state and an input. In some embodiments, the input is a concatenation of the previous feedback output of the LSTM unit or another LSTM unit, with one or more input values from previous LSTM units. At the forget gate, the LSTM unit determines whether to remember or forget elements of the cell state. The input of the LSTM unit is used to generate a vector that includes a 1 or 0 for each element in the cell state. The vector is then multiplied at the forget gate with the cell state. A value of 1 will cause the LSTM unit to remember the element, whereas a value of 0 will cause the LSTM unit to forget the element.

At the input gate, a modification to the cell state is generated from the input. The modification to the cell state comprises an addition to the cell state generated from the input and a first set of weights also generated from the input. The addition to the cell state is multiplied by the first set of weights to produce the modification to the cell state. The modification to the cell state and the output of the forget gate are combined in an addition operation to generate a new cell state.

At the output gate, the input is used to determine what elements of the new cell state to transmit as an output of the LSTM unit. The new cell state is processed and a second set of weights is generated from the input. The second set of weights is multiplied by the processed new cell state to select, remove, and scale elements of the new cell state to generate an output for the LSTM unit. The new cell state can be returned to the LSTM unit as a new received cell state. In some cases, the output is returned to the LSTM unit as part of a new input in a recurrent loop.

Figure 4:
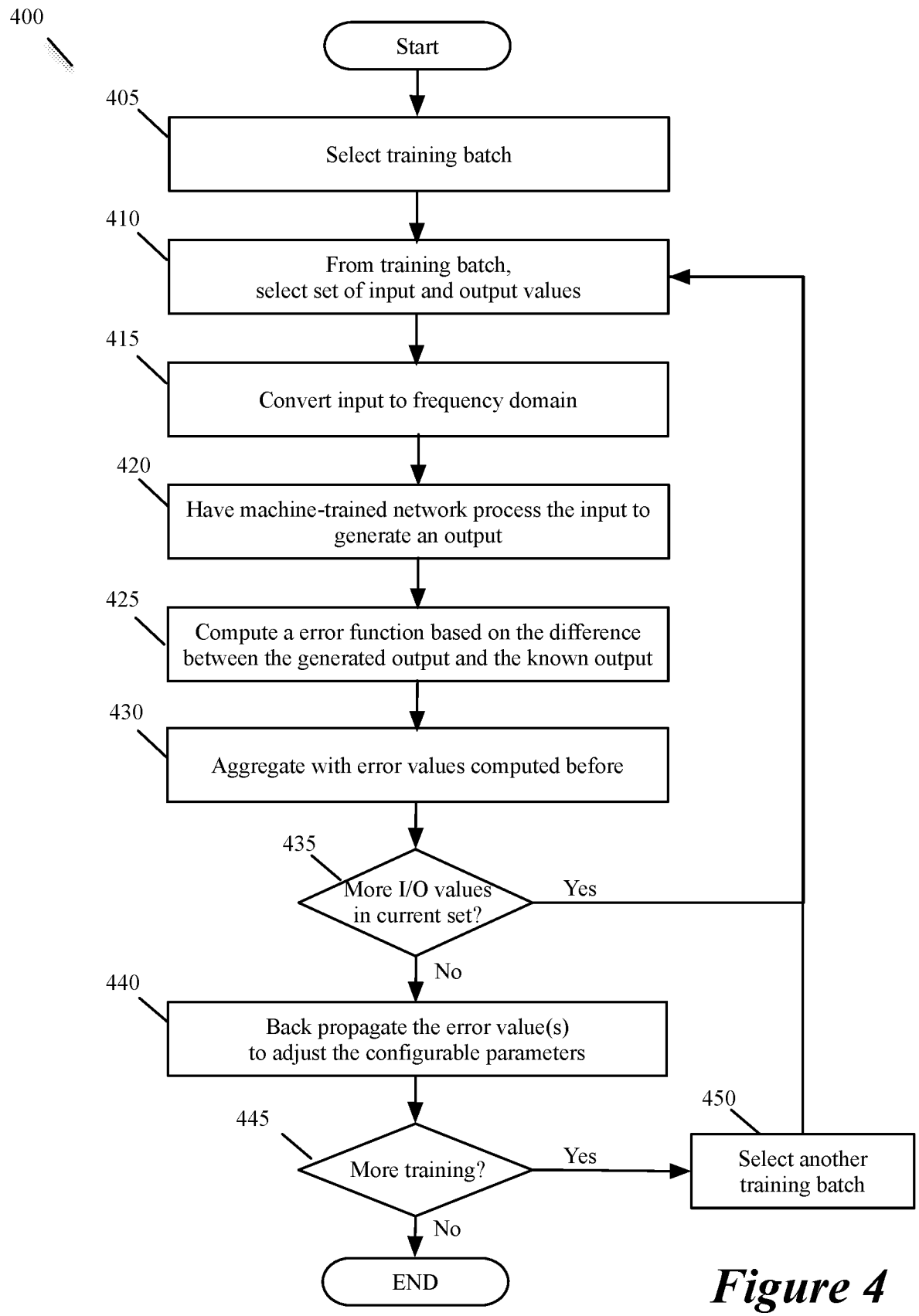
FIG. 4 illustrates a process for training a machine trained network.

During training of the neural network, the LSTM unit uses backpropagation through time to adjust the weights and scalars to correct errors in order to make its own output match that of provided solutions, thereby teaching the network to accurately perform an operation. FIG. 4 illustrates a process 400 for training the MT network 120. As shown, the process 400 initially selects (at 405) a training batch with several audio input values with known output values. The process iterates through multiple different training batches as further described below.

In some embodiments, each training set includes (1) a first group of inputs/output with each input having a vocative use of the wake expression and its corresponding output value specifying that the input includes a vocative use of the wake expression, (2) a second group of input/outputs with each input having a non-vocative use of the wake expression and its corresponding output specifying that the input does not include a vocative use of the wake expression, and (3) a third group of inputs/outputs with each input not including any case of the wake expression and the output indicating that the corresponding input does not include a vocative use of the wake expression. In some embodiments, the input in these groups include recording of one or more people reciting the wake expression in vocative and non-vocative ways as well as reciting other expressions. The recitation of the wake expressions in some of these recordings is followed by a request in some embodiments. In some embodiments, the audio input also includes machine-generated sounds and recitations as well as other sounds.

As mentioned above, some embodiments use both grammar and prosody to discriminate vocative uses of the wake expression from the non-vocative uses (from the dative, genitive, ablative cases of the wake expression). Accordingly, the input values in the first and second input/output groups (that include vocative and non-vocative utterances of the wake expression) use the wake expression differently in different syntactical sentence structures and with different tonal deliveries that are associated with the vocative use of the wake expression and the non-vocative use of the wake expression. The different syntactical sentence structures of the first and second groups differentiate syntactical sentence structures associated with the vocative use of the expression from syntactical sentence structures associated with non-vocative uses (e.g., ablative, dative and genitive uses) of the wake expression. Similarly, the different prosodic utterances of the first and second groups differentiate prosodic utterances associated with the vocative use of the expression from prosodic utterances associated with non-vocative uses (e.g., ablative, dative and genitive uses) of the wake expression.

For instance, when the wake expression includes the digital assistant's name, one or more of the vocative audio inputs would include a pause before invoking the name of the digital assistant with the tone going up after the initial one or two syllables (e.g., saying Alexa with a pause before it and the tone going up after the first syllable). Also, in some embodiments, several of the non-vocative inputs include the wake expression (e.g., the digital assistants name) after prepositions (e.g., to, with, from, etc.) that are associated with the dative use of the wake expression (e.g., "tired of Alexa") or ablative use of the wake expression (e.g., "I'm done with Alexa"), or are in syntactical structures associated with other cases of the wake expression (e.g., the accusative use such as "my daughter loves Alexa"). The MT network in some embodiments is also trained with the prosodic delivery of these non-vocative utterance of the wake expression.

After selecting (at 405) the training batch, the process selects (at 410) one set of input/output values in the selected training batch. Next, at 415, the process converts the selected input from a time domain representation into a frequency domain representation by using a transform operator (e.g., a Fourier transform, a wavelet transform, etc.). At 420, the process 400 provides the inputs to the machine-trained network's input nodes. In some embodiments, the process provides different combination of frequency components of the transformed audio input to different input nodes of the machine-trained network.

For the audio input, the MT network produces (at 420) an output value set. From the produced output value, the process 400 then computes (at 425) an error value to express an error between the produced output value set and the known output value of the input value. In some embodiments, the MT network produces the start and/or end of the detected wake expression. In some of these embodiments, the error value computed at 425 is also based on the difference between the detected start and/or end of the detected wake expression, and the actual (i.e., known) start and/or end of the wake expression in the processed input/output pair.

At 430, the process 400 aggregates the computed error (i.e., the error computed for the current input/output pair at 425), with any other errors that it computed for the current training batch in previous iterations through 425. In its first pass through 425 for a training batch, there are no prior error values that the process computed for the training batch. As further described below, the process 400 performs a back-propagation operation to configure the configurable parameters (e.g., the weight values in FIG. 3) of the MT network 120.

Next, at 435, the process determines whether the current training set has more input/output pairs to process. If so, the process returns to 410 to select another pair of input/output pairs from the training set, and then repeats its operations for this selected pair. When the process determines (at 435) that it has processed all the input/output pairs in the current training set, the process performs (at 440) a back-propagation operation based on the error values that it aggregated at 430 in order to adjust the configurable parameters of the MT network based on its processing of the current training set.

Next, at 445, the process determines whether it should stop the training of the MT network. In some embodiments, the solution selector 505 uses a minimization process (e.g., a stochastic gradient descent minimizer) to determine when it should stop the training of the MT network. When the process 400 determines that it should continue the training, the process 400 selects (at 450) another training batch, returns to 410 to select an input/output pair in the new training batch, and then repeats it operations for this selected input/output pair.

In some embodiments, the process 400 can iterate multiple times through one input/output pair, while this process is training the configurable parameters of the machine-trained network 120. The process 400 ends when it determines that it does not need to continue the training. After multiple processing multiple batches and/or adjusting the configurable parameters of the processing nodes based on this processing, the MT network is trained to detect vocative uses of the wake expression from non-vocative uses of the wake expression and from audio input that does not include any case of the wake expression.

Figure 5:
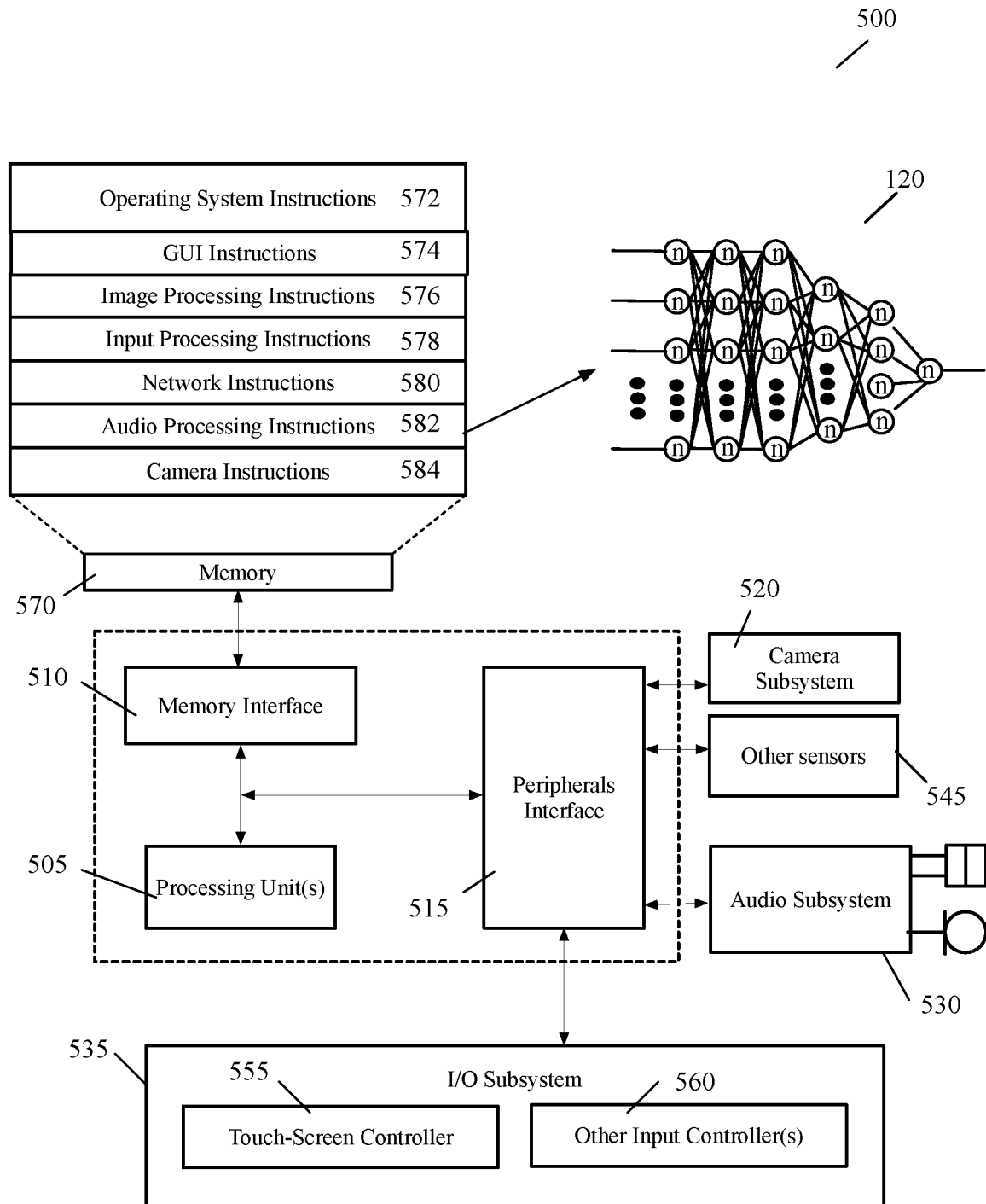
FIG. 5 is an example of a device that employs the machine trained network of some embodiments.

FIG. 5 is an example of a device 500 that employs the MT network 120 of some embodiments. Examples of such a device 500 include a standalone digital assistant or a mobile device or IoT (Internet of Things) device that has a digital assistant functionality. Examples of such a mobile device or IoT device include smartphones, tablets, laptops, etc. As shown, the device 500 includes one or more processing units 505, a memory interface 510 and a peripherals interface 515.

The peripherals interface 515 is coupled to various sensors and subsystems, including a camera subsystem 520, an audio subsystem 530, an I/O subsystem 535, and other sensors 545 (e.g., motion sensors), etc. The peripherals interface 515 enables communication between the processing units 505 and various peripherals. For example, an orientation sensor (e.g., a gyroscope) and an acceleration sensor (e.g., an accelerometer) can be coupled to the peripherals interface 515 to facilitate orientation and acceleration functions. The camera subsystem 520 is coupled to one or more optical sensors (e.g., a charged coupled device (CCD) optical sensor, a complementary metal-oxide-semiconductor (CMOS) optical sensor, etc.). The camera subsystem 520 and the optical sensors facilitate camera functions, such as image and/or video data capturing.

The audio subsystem 530 couples with a speaker to output audio (e.g., to output voice navigation instructions). Additionally, the audio subsystem 530 is coupled to a microphone to facilitate voice-enabled functions, such as voice recognition (e.g., for searching), digital recording, etc. The I/O subsystem 535 handles the transfer between input/output peripheral devices, such as a display, a touch screen, etc., and the data bus of the processing units 505 through the peripherals interface 515. The I/O subsystem 535 includes a touch-screen controller 555 and other input controllers 560 to facilitate the transfer between input/output peripheral devices and the data bus of the processing units 505. The touch-screen controller couples with a touch screen (not shown) to detect contact and movement on the touch screen using any of multiple touch sensitivity technologies. The other input controllers 560 are coupled to other input/control devices, such as one or more buttons.

In some embodiments, the device includes wireless communication subsystem (not shown in FIG. 5) to establish wireless communication functions. In some embodiments, the wireless communication subsystem includes radio frequency receivers and transmitters, and/or optical receivers and transmitters. These receivers and transmitters of some embodiments are implemented to operate over one or more communication networks such as a GSM network, a Wi-Fi network, a Bluetooth network, etc.

The memory interface 510 is coupled to memory 570. In some embodiments, the memory 570 includes volatile memory (e.g., high-speed random access memory), non-volatile memory (e.g., flash memory), a combination of volatile and non-volatile memory, and/or any other type of memory. The processing units 505 execute the instructions stored in the memory 570 in some embodiments.

As illustrated in FIG. 5, the memory 570 stores an operating system (OS) 572. The OS 572 includes instructions for handling basic system services and for performing hardware dependent tasks. The memory 570 also stores (1) graphical user interface instructions 574 to facilitate graphic user interface processing, (2) image processing instructions 576 to facilitate image-related processing and functions, (3) input processing instructions 578 to facilitate input-related (e.g., touch input) processes and functions, (4) network instructions 580 to communicate with external devices and machines, (5) audio processing instructions 580 to facilitate audio-related processes and functions; and (6) camera instructions 584 to facilitate camera-related processes and functions.

As shown, the audio processing instructions 582 include instructions for implementing MT network 120 of some embodiments along with the audio processor 115 and natural language processor 125. The command processor in some embodiments is implemented by the input processing instructions 578. In other embodiments, the NLP 125 and the command processor 130 are implemented by external machines (e.g., external servers) that the device 500 communicates with based on the network communication instructions 580.

The memory 570 further stores communication instructions to facilitate communicating with one or more additional devices. The instructions described above are merely exemplary and the memory 570 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 5 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 5 may be split into two or more integrated circuits.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

Processes can be performed by software or firmware processes. Also, multiple processes can be implemented as sub-parts of a larger program even though they were described as distinct processes. Once a process is installed to operate on an electronic device, it defines one or more specific machine implementations that execute and perform the operations of the process.

Figure 6:
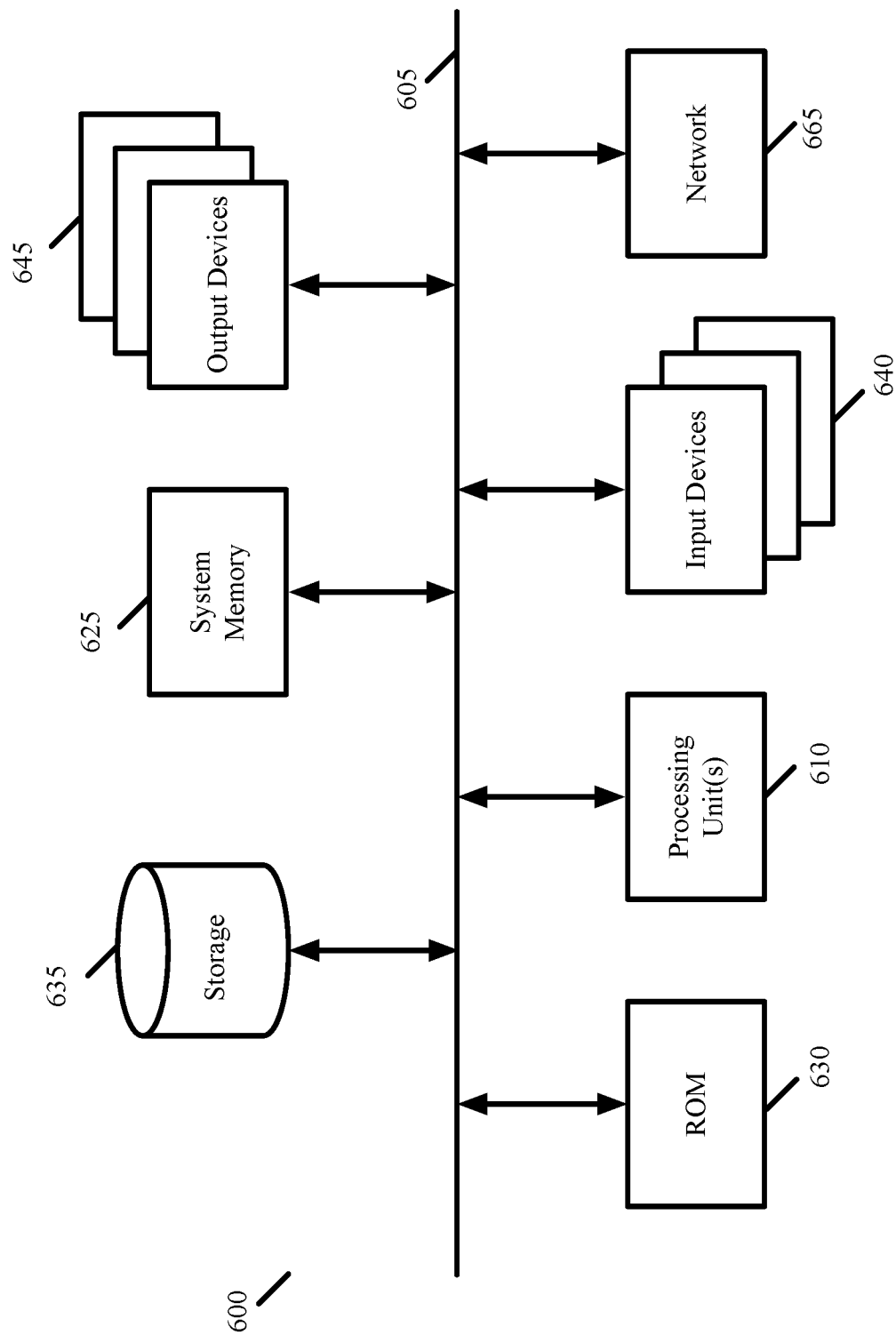
FIG. 6 conceptually illustrates a computer system with which some embodiments of the invention are implemented.

FIG. 6 conceptually illustrates a computer system 600 with which some embodiments of the invention are implemented. As such, it can be used to execute some of the above-described processes (e.g., the machine training process 400). This computer system includes various types of non-transitory machine readable media and interfaces for various other types of machine readable media. Computer system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the computer system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments. The read-only-memory (ROM) 630 stores static data and instructions that are needed by the processing unit(s) 610 and other modules of the computer system. The permanent storage device 635, on the other hand, is a read-and-write memory device. This device is a non-volatile memory unit that stores instructions and data even when the computer system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory is a volatile read-and-write memory, such a random access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the computer system. The input devices 640 include alphanumeric keyboards and pointing devices (also called "cursor control devices"). The output devices 645 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 6, bus 605 also couples computer system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of computer system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. One of ordinary skill in the art would understand that the invention is not to be limited by the foregoing illustrative details, but rather is to be defined by the appended claims.

The invention claimed is:

1. A method of training a machine-trained (MT) network to detect a wake expression that directs a digital assistant to perform an operation based on a request that follows the wake expression, the MT network comprising a plurality of processing nodes with configurable parameters, the method comprising:
iteratively selecting different sets of input values with known sets of output values, wherein each of a first group of input value sets comprises a vocative use of the wake expression and has a corresponding output value set that specifies that the input value set comprises a vocative use of the wake expression, while each of a second group of input value sets comprises a non-vocative use of the wake expression and has a corresponding output value set that specifies that the input value set does not comprise a vocative use of the wake expression, wherein each of a plurality of vocative uses includes a particular tonal inflection of the wake expression while each of a plurality of non-vocative uses does not include the particular tonal inflection of the wake expression;
for each input value set:
using the MT network to process the input value set to produce an output value set; and
computing an error value that expresses an error between the produced output value set and the known output value set of the input value set; and
based on the error values computed for the different sets of input/output values, adjusting configurable parameters of the processing nodes of the MT processing node network.

2. The method of claim 1, wherein the non-vocative uses of the wake expression comprise at least one of an ablative use of the wake expression, a dative use of the wake expression and a genitive use of the wake expression.

3. The method of claim 1, wherein the input value sets in the first and second groups comprise different prosodic utterances of the wake expression, with the input value sets of the first group including prosodic utterances of the wake expression associated with the vocative use of the wake expression while the input value sets of the second group including prosodic utterances of the wake expression associated with the non-vocative use of the wake expression.

4. The method of claim 3, wherein the different prosodic utterances of the first and second groups differentiate prosodic utterances associated with the vocative use of the expression from prosodic utterances associated with at least one of an ablative use of the wake expression, a dative use of the wake expression and a genitive use of the wake expression.

5. The method of claim 1, wherein the input value sets in the first and second groups use the wake expression differently in different syntactical sentence structures associated with the vocative use of the wake expression and the non-vocative use of the wake expression.

6. The method of claim 5, wherein the different syntactical sentence structures of the first and second groups differentiate syntactical sentence structures associated with the vocative use of the expression from syntactical sentence structures associated with at least one of an ablative use of the wake expression, a dative use of the wake expression and a genitive use of the wake expression.

7. The method of claim 5, wherein the input value sets in the first and second groups comprise different prosodic utterances of the wake expression, with the input value sets of the first group including prosodic utterances of the wake expression associated with the vocative use of the wake expression while the input value sets of the second group including prosodic utterances of the wake expression associated with the non-vocative use of the wake expression.

8. The method of claim 1, wherein the MT network is a neural network and adjusting the configurable parameters comprises performing a back-propagation operation that adjusts the configurable parameters based on partial derivatives of an error function with respect to different configurable parameters.

9. The method of claim 1, wherein a known or produced output value set comprises multiple output bits.

10. The method of claim 1, wherein the MT network comprises a recurrent neural network.

11. The method of claim 1, wherein the MT network comprises an LSTM (long short term memory) network.

12. A non-transitory machine readable medium storing a program for execution by at least one hardware processing unit of a digital assistant and for directing the digital assistant to perform an operation based on a vocative use of a wake expression, the program comprising sets of instructions for:
    receiving a plurality of different audio inputs, a subset of which comprise a vocative use of the wake expression with a particular tonal inflection of the wake expression;
    converting each received audio input from a time domain representation to a frequency domain representation in order to assess the audio input to determine whether the audio input includes a vocative use of the wake expression with the particular tonal inflection of the wake expression;
    supplying each received, converted audio input to a machine-trained network with a plurality of layers of processing nodes that are trained through machine learning to perform frequency domain analysis of the received, converted audio inputs to differentiate vocative uses of the wake expression from non-vocative uses of the wake expression;
    receiving an output value for each received, converted audio input from the machine-trained network to indicate whether the audio input includes a vocative use of the wake expression; and
    when the output value indicates that the audio input includes the vocative use of the wake expression, directing the digital assistant to perform an operation based on input that follows the wake expression.

13. The non-transitory machine readable medium of claim 12, wherein the program further comprises a set of instructions for discarding the audio input when the output value indicates that the audio input does not include the vocative use of the wake expression.

14. The non-transitory machine readable medium of claim 12, wherein the input that follows the wake expression are audio samples that are part of the received audio input.

15. The non-transitory machine readable medium of claim 12, wherein the received audio input comprises a first set of audio input samples, wherein the program further comprises a set of instructions for receiving a second set of audio input samples after receiving the first set of audio input samples, the second set of audio input samples comprising the input that follows the wake expression.

16. The non-transitory machine readable medium of claim 12, wherein the received audio input is captured by a microphone associated with the digital assistant and the input that follows the wake expression comprises image input that is captured after the audio input is captured.

17. A method of directing a digital assistant to perform an operation based on a request that follows a wake expression, the method comprising:
    capturing a first audio input that includes a vocative use of the wake expression with a particular tonal inflection of the wake expression;
    converting the first audio input from a time domain representation to a frequency domain representation in order to assess the first audio input to determine whether the first audio input includes a vocative use of the wake expression with the particular tonal inflection of the wake expression;
    processing the first, converted audio input with a machine-trained network comprising a plurality of layers of processing nodes that are trained through machine learning to perform frequency domain analysis of the first, converted audio input to differentiate vocative uses of the wake expression from non-vocative uses of the wake expression; and
    based on an output of the machine-trained network specifying that the first, converted audio input includes the vocative use of the wake expression, directing the digital assistant to perform an operation based on input that follows the wake expression.

18. The method of claim 17 further comprising:
    capturing a second audio input that includes a non-vocative use of the wake expression;
    processing the second audio input with the machine-trained network to determine that the second audio input does not include the vocative use of the wake expression; and
    discarding the second audio input without directing the digital assistant to perform an operation based on any input that follows the second audio input.

* * * * *